United States Patent
Novak et al.

(10) Patent No.: US 7,054,280 B2
(45) Date of Patent: May 30, 2006

(54) VOICE COMMUNICATION BETWEEN A PORTABLE COMMUNICATION APPARATUS AND AN EXTERNAL TERMINAL

(75) Inventors: Lars Novak, Lund (SE); Tomas Holmström, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 963 days.

(21) Appl. No.: 09/969,371

(22) Filed: Oct. 1, 2001

(65) Prior Publication Data

US 2002/0041589 A1    Apr. 11, 2002

(30) Foreign Application Priority Data

Oct. 9, 2000    (SE) .................................. 0003645

(51) Int. Cl.
*H04B 7/00*    (2006.01)

(52) U.S. Cl. .................... 370/310.1; 370/352; 370/435

(58) Field of Classification Search ............... 370/328, 370/338, 352, 465, 466, 433, 435; 455/557, 455/558, 559
See application file for complete search history.

(56) References Cited

U.S. PATENT DOCUMENTS

| | | | |
|---|---|---|---|
| 5,483,531 A | 1/1996 | Jouin et al. ................ 370/79 |
| 5,793,744 A | 8/1998 | Kanerva et al. ............ 370/209 |
| 5,802,051 A | 9/1998 | Petersen et al. ........... 370/395 |
| 5,903,849 A | 5/1999 | Selin et al. ................. 455/557 |
| 5,907,815 A * | 5/1999 | Grimm et al. .............. 455/557 |
| 6,295,456 B1 * | 9/2001 | Baker et al. ................ 455/463 |
| 6,442,220 B1 * | 8/2002 | Sihlbom ..................... 375/343 |
| 6,570,891 B1 * | 5/2003 | Arimilli ...................... 370/536 |
| 6,587,823 B1 * | 7/2003 | Kang et al. ................. 704/275 |
| 6,754,241 B1 * | 6/2004 | Krishnamurthy et al. ... 370/537 |
| 6,807,154 B1 * | 10/2004 | Malmgren et al. .......... 370/252 |
| 2004/0135671 A1 * | 7/2004 | Khoshbin et al. .......... 340/7.53 |

FOREIGN PATENT DOCUMENTS

| | | |
|---|---|---|
| EP | 0 550 151 A1 | 7/1993 |
| JP | 09247754 | 9/1997 |
| WO | WO 96/09708 | 3/1996 |
| WO | WO 98/35517 | 8/1998 |

OTHER PUBLICATIONS

PCT International-Type Search Report for SE 0003645-9 completed Jun. 20, 2001.
International Search Report as completed on Jan. 25, 2002, by the ISA/SE, in connection to International Application No. PCT/SE01/02028 as filed Sep. 21, 2001.

* cited by examiner

*Primary Examiner*—Chau Nguyen
*Assistant Examiner*—Anthony Sol

(57) ABSTRACT

A portable communication apparatus (200) for radio communication of digital audio data (240) representing analog voice signals has an asynchronous interface (250) for exchanging digital non-audio data (242, 244) with an external terminal (300). The apparatus (200) is adapted to exchange asynchronously the digital audio data (240) with the external terminal (300) over the asynchronous interface (250).

18 Claims, 3 Drawing Sheets

Figure 1:
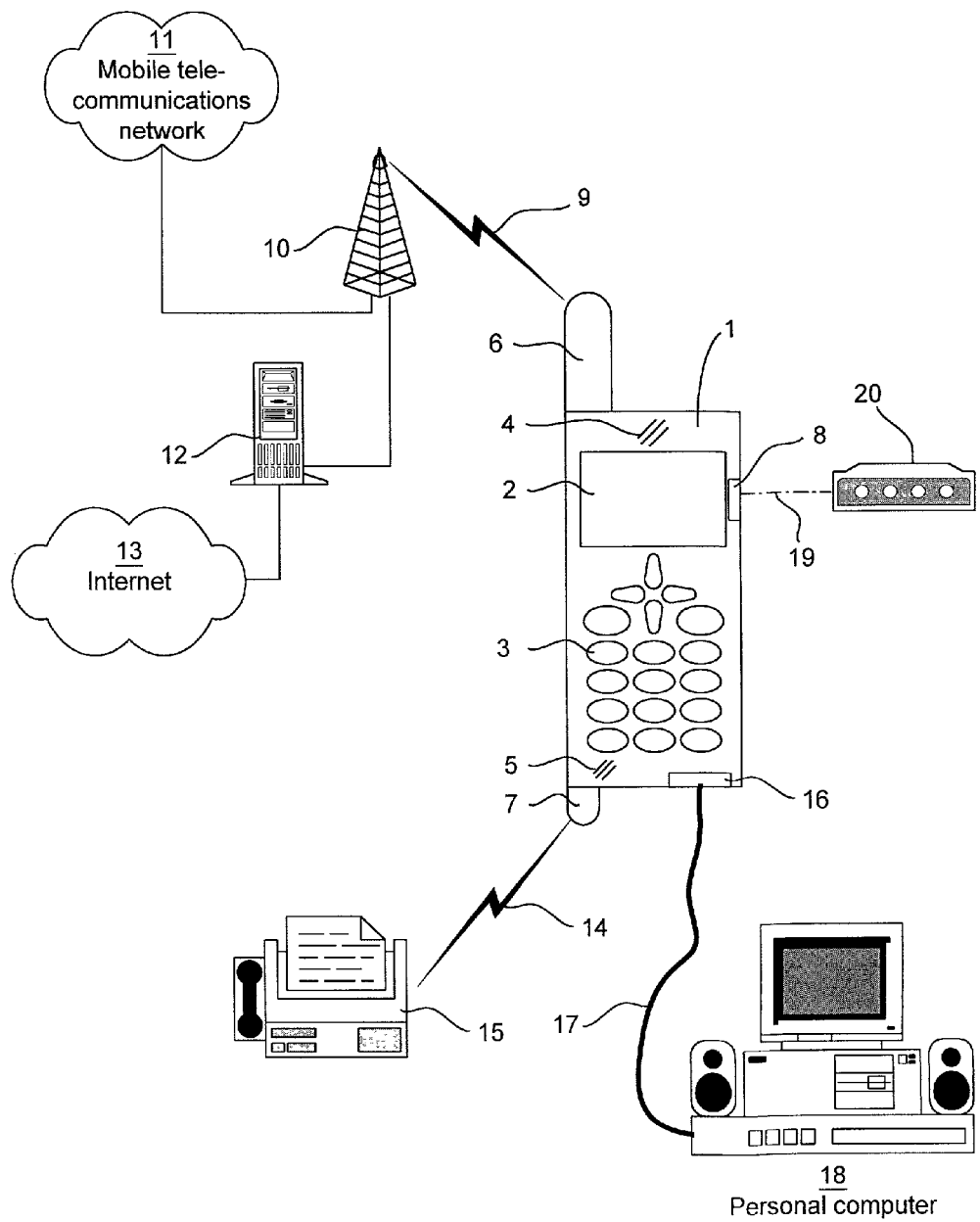

VOICE COMMUNICATION BETWEEN A PORTABLE COMMUNICATION APPARATUS AND AN EXTERNAL TERMINAL

TECHNICAL FIELD

Generally speaking, the present invention relates to portable communication apparatuses of the type capable of communicating vocal information or speech between human users. More specifically, the invention relates to a portable communication apparatus having an asynchronous interface for exchanging digital data with an external terminal.

DESCRIPTION OF THE PRIOR ART

Examples of a portable communication apparatus as set out above are a mobile telephone, a cordless telephone, a portable digital assistant, a communicator, a paging device, an electronic payment device, or a portable navigating device. For the rest of this document, reference will be made to a mobile telephone for any mobile communications network such as GSM or UMTS. However, the invention is not limited to merely a mobile telephone. On the contrary, the invention is best defined by the appended independent claims.

Traditionally, older mobile telephones were only capable of providing speech communication between two human users through a mobile communications network and, in many situations, a public switched telephone network. More recently, mobile telephones have been provided with additional functionality, such as capability of providing communication of binary data and/or facsimile data between the portable communication apparatus and an external terminal. Such an external terminal may for instance be a desktop personal computer, a portable personal computer or a palm-top computer. The external terminal is usually connected to the mobile telephone through a wire-based interface (such as a serial cable connected to a system connector on the mobile telephone), an infrared link (such as IrDA) or a radio link for short-range supplementary data communication (such as Bluetooth® over the 2.4 GHz ISM band).

Binary data or facsimile data are normally transmitted in an asynchronous manner between the mobile telephone and the external terminal. The nature of binary data and facsimile data makes them suitable for asynchronous transfer; the data to be transferred may be divided into packets of variable lengths, which are subsequently received and restored at the receiving end (either the mobile telephone or the external terminal).

Digital voice, on the other hand, is normally transferred synchronously in a telephone system by using e.g. PCM 64 kb/s encoding, involving a continuous bitstream transfer with strict timing requirements. The reason for these strict timing requirements is obvious; human speech has a "real-time" nature, that does not allow unexpected delays or buffering, which may occur during asynchronous transfer.

Bearing in mind that speech traditionally must be communicated synchronously between a mobile telephone and an external terminal, it is difficult to combine this with simultaneous transfer of asynchronous binary data or facsimile data. In other words, problems may occur when attempting to transfer speech (with preserved timing) between a mobile telephone and an external terminal, while simultaneously trying to transfer asynchronous binary or facsimile data on a common multiplexed connection. The reason for this is that voice samples must be sent with exactly the same timing, as they are produced. Generally, no buffering is allowed. In any event, any buffering must be made with great care, since it may introduce unacceptably large delay or delay jitter. If a large amount of asynchronous binary or facsimile data would be sent over the connection, some of the voice samples might be delayed to the extent that the timing between consecutive voice samples is lost.

WO 98/35517 discloses a portable communication device and an external accessory, between which full-duplex asynchronous communication occurs over a synchronous digital interface. A synchronous digital voice signal is multiplexed with an asynchronous data signal onto the synchronous interface.

SUMMARY OF THE INVENTION

It is an object of the present invention to allow digital speech to be transferred simultaneously with binary or facsimile data on the same connection. More specifically, the invention is aimed at communicating speech over a multiplexed connection together with asynchronous data transfers between a mobile station and an external terminal, where the communication of speech is efficient in terms of capacity.

The above objects have been achieved by adapting the mobile station and the external terminal to use an asynchronous communication protocol not only for communication of binary data and facsimile data, but also for transferring speech. Speech is transferred asynchronously in encoded form (such as GSM-encoded) over aforesaid asynchronous communication protocol together with binary data and facsimile data.

More specifically, the objects have been achieved through a combination of three measures:

Speech is compressed (encoded), which reduces the required bandwidth,

Speech is prioritized over binary data and facsimile data. From moment to moment, if there is enough bandwidth available, binary data and facsimile data will be multiplexed with speech, otherwise only the speech will be communicated.

Flow control is applied to the asynchronous communication protocol so as to allow certain synchronization of the speech. In this way, a virtual synchronous speech channel is established over the asynchronous communication protocol.

The solution to the above objects is best defined by the appended independent patent claims. Other objects, features and advantages will appear from the following detailed disclosure, from the subclaims as well as from the accompanying drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTIONS OF THE DRAWINGS

Figure 2:
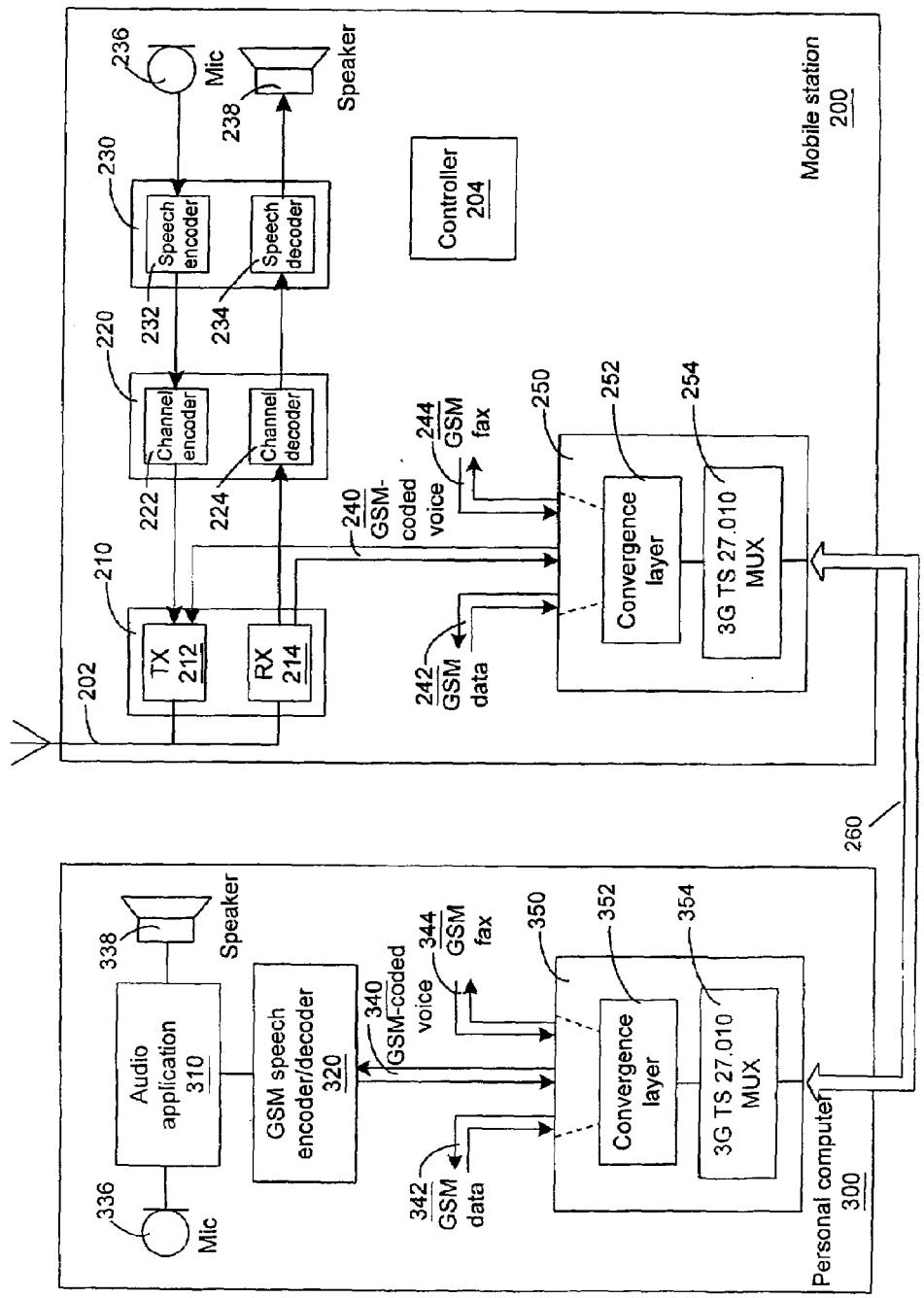
Figure 3:
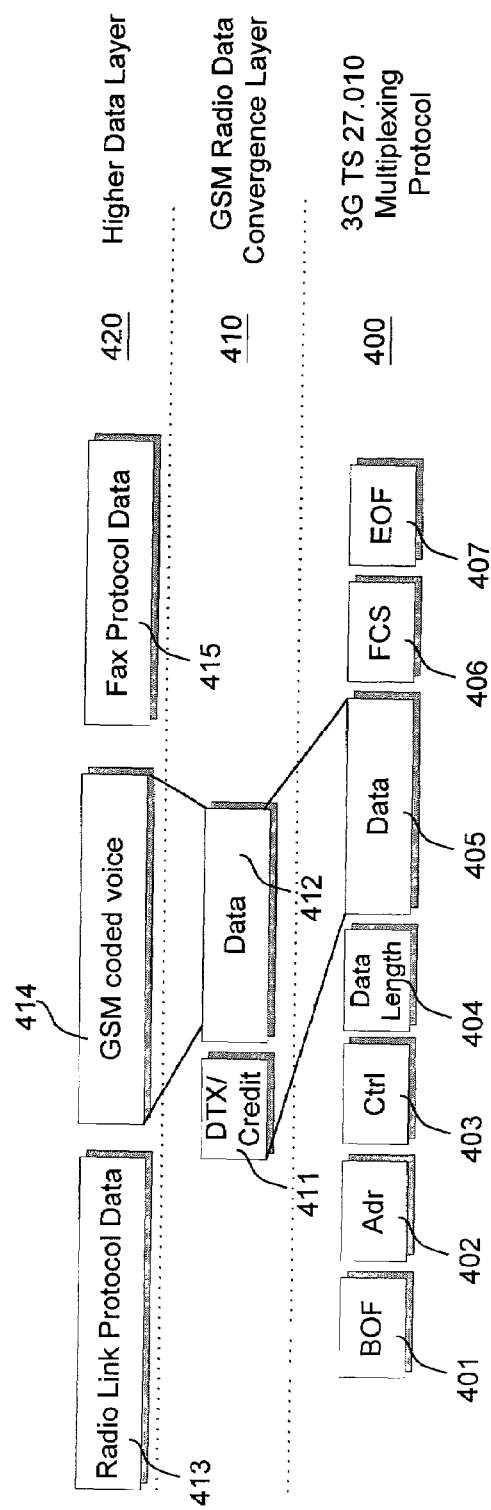

A preferred embodiment of the present invention will now be described in more detail with reference to the accompanying drawings, in which:

FIG. 1 is a schematic block diagram of a mobile telephone operatively connected to a mobile telecommunications network as well as a few external accessories, including a personal computer, FIG. 2 is a block diagram of the mobile telephone and the personal computer shown in FIG. 1, and FIG. 3 is a schematic diagram of a protocol structure for communication of speech, data and fax between the mobile telephone and the personal computer of FIGS. 1 and 2.

DETAILED DISCLOSURE OF THE INVENTION

Reference is first made to FIG. 1, which illustrates a portable communication apparatus in the form of an exemplifying mobile telephone 1, as well as the environment in which it operates. In a normal fashion, the mobile telephone 1 comprises a display 2, a keyboard 3, a loudspeaker 4, and a microphone 5. The components 2–5 together form a man-machine interface, through which a user of the mobile telephone 1 may interact with and operate the mobile telephone. Moreover, the mobile telephone 1 comprises a first antenna 6 for establishing a wireless connection 9 to a mobile telecommunications network 11 through a base station 10. The mobile telecommunications network 11 may for instance be a GSM network ("Global System for Mobile communications") or UMTS ("Universal Mobile Telephone System"). The mobile telephone 1 may also be used for accessing a global information network 13, through a gateway 12, over the wireless link 9. The global information network 13 may be the Internet, and the gateway 12 may be a WAP server.

The exemplifying mobile telephone 1 also comprises a second antenna 7, which may be used for establishing a short-range supplementary data connection 14 to a first external device 15. The link 14 may be a Bluetooth® link, as described in previous sections of this document. The external device 15 may e.g. be a printer, a facsimile device, a modem, a cordless telephone accessory (such as a head set), a computer (e.g. a stationary desktop computer or a portable laptop computer), but many other devices are also possible.

In addition to the above, the mobile telephone 1 further comprises an IR (infrared) interface 8, by means of which the mobile telephone 1 may establish an IR link 19 to a second external device 20 exemplified by a modem in FIG. 1.

Moreover, a third external device 18 may be connected to the mobile telephone 1 through a serial cable 17, which is plugged into a system connector 16 in the housing of the mobile telephone 1. The third external device 18 will be referred to as the "external terminal" in the rest of this specification.

The external terminal 18 is exemplified as a desktop personal computer in FIG. 1. However, it may equally well be a portable personal computer, a palmtop computer, a portable digital assistant, etc. The external terminal 18 is capable of performing different types of digital communication with the mobile telephone 1, such as transfer of binary data and/or electronic facsimile data between the terminal 18 and the telephone 1. Additionally, as will be explained below, vocal information (i.e. human speech) may be communicated between the terminal 18 and the telephone 1. One conceivable application, among many other, is a situation where a user will speak and listen through the speaker and the microphone of the external terminal 18 rather than the corresponding components of the mobile telephone. In other words, the external terminal 18 will be used as a kind of hands-free equipment in such an application.

The mobile telephone and the personal computer are given a more detailed illustration in FIG. 2. The mobile station 200 of FIG. 2 corresponds to the mobile telephone 1 of FIG. 1, whereas the personal computer 300 of FIG. 2 represents the external terminal 18 of FIG. 1.

The mobile station 200 is a GSM TDMA telephone and comprises an antenna 202, a radio block 210, a channel encoding/decoding block 220, a speech encoding/decoding block 230, a controller 204, a microphone 236 and a speaker 238. These components all have a design, which is well-known and typical for a TDMA telephone commonly available on the market. Therefore, they are only given a brief description below; the detailed architecture thereof is believed to be well-known to the skilled person.

The speech encoding/decoding block 230 comprises a speech encoder 232, an input of which is connected to an output of the microphone 236 and an output of which is connected to an input of a channel encoder 222 in block 220. An output of the channel encoder 222 is connected to an input of a transmitter 212, which is part of the radio block 210. An output of the transmitter 212 is connected to the antenna 202. Hence, in a well-known way the microphone 236 receives a spoken audible input from a user and converts it into a corresponding electric signal, which is supplied to the speech encoder 232. The speech encoder 232 converts the signal to digital form and then applies either HR, FR or EFR speech encoding (in accordance with applicable GSM specifications, such as GSM/DCS Technical Specification 06.10) to the signal and supplies the result to the channel encoder 222, which performs channel encoding according to GSM TDMA standard (in accordance with e.g. GSM/DCS Technical Specification 05.03). The output of the channel encoder 222 is fed to the transmitter 212, which comprises various electronic circuits, such as power amplifier, filters, local oscillators and mixers. The output of the transmitter 212 is a high-frequency TDMA signal in the 900 or 1800 MHz band, which is supplied to the antenna 202 and is emitted into open air as electromagnetic waves propagating from the antenna 202.

Correspondingly, an incoming TDMA signal is received at the antenna 202 and is processed by a receiver 214 in the radio block 210. Basically, the operation of the receiver 214 is the inverse of that of the transmitter 212. An output of the receiver 214 is decoded in a channel decoder 224 in block 220 and is furthermore decoded by a speech decoder 234 in block 230. The output thereof is supplied to the speaker 238, which converts the electric signal into acoustic sound waves to be emitted to the user.

As is readily realized, the controller 204 is responsible for the overall operation and control of the mobile station 200. The controller 204 is advantageously implemented by any commercially available microprocessor, or another type of programmable logic circuitry.

The mobile station 200 also has a communication unit 250, which forms an asynchronous interface to the personal computer 300 (i.e. the external terminal) over a physical connection 260. The connection 260 is preferably established over a serial cable; however, other links than wire-based are equally possible, e.g. an infrared link (such as IrDA) or a short-range supplementary data link (such as Bluetooth®).

The communication unit 250 comprises circuitry for serial communication, such as an UART, a MUX, etc., combined with appropriate control logic and software. The communication unit 250 forms an asynchronous serial communication protocol, which is based on the 3G TS 27.010 multiplexing protocol (reference numeral 254 in FIG. 2, 400 in FIG. 3). This protocol is part of the Third Generation Partnership Project (3G PP) and comprises a GSM radio data convergence layer 252, 410, which will be explained in more detail with reference to FIG. 3. However, other asynchronous communication protocols are equally possible, such as the ETSI GSM 07.10 protocol, as long as the functional requirements below are fulfilled.

The communication unit 250 provides an asynchronous communication channel, over the physical connection 260, to the personal computer 300, through which binary data 242 and facsimile data 244 may be communicated. According to the invention, in addition to the above, the communication unit 250 is also adapted to communicate digital audio data 240, representing GSM-encoded voice signals, through the protocol layers 252 and 254 to the personal computer 300. For instance, GSM-encoded digital audio data may be received directly from the transmitter 212 of the radio block 210 (data field 414 in FIG. 3), be put in a data field 412 within the GSM radio data convergence layer 410, moreover be contained within a data field 405 of the 3G TS 27.010 multiplexing protocol 254, 400 and ultimately be transferred across the physical connection 260 to the personal computer 300. Here, the digital audio data will be unpacked through the layers 354/400 and 352/410 in the communication unit 350 of the personal computer 300. Then, the unpacked GSM-encoded digital audio data 340 will be forwarded to a GSM speech encoder/decoder 320, which will perform channel and speech decoding corresponding to the above-described operation of the channel decoder 222 in the channel encoding/decoding block 220 and the speech decoder 234 in the speech encoding/decoding block 230 of the mobile station 200. The decoded voice signal may be supplied to an audio application 310, which will emit the voice signal through a speaker 338 of the personal computer 300.

Moreover, the audio application 310 may capture a voice signal through a microphone 336 of the personal computer 300 and forward the voice signal to the GSM speech encoder/decoder 320. Here, GSM-encoded digital audio data 340 will be produced and supplied to the communication unit 350, which will put the digital audio data 414 in the data field 412 of the convergence layer 352/410. The data will in turn be contained in the data field 405 of the 27.010 multiplexing protocol 354/400 and be transmitted across the physical connection 260 to the communication unit 250 of the mobile station 200. The digital audio data originating from the microphone 336 of the personal computer 300 will traverse through the protocols 254/400 and 252/410 and will ultimately be supplied as GSM-encoded digital audio data 240 to the transmitter 212 of the mobile station 200, which may transmit the received digital audio data, representing speech from a user of the personal computer 300, through the antenna 202 to another mobile telecommunications party.

Accordingly, in the preferred embodiment, it is possible to transfer digital audio data related to voice signals as GSM-encoded speech through an asynchronous communication protocol, where the GSM-encoded speech may be multiplexed with other digital data, such as binary data 242/342/413 or facsimile data 244/344/415. This provides at least two important advantages. First of all, since the speech is GSM-encoded, it will require less capacity for transfer. Secondly, since the 3G TS 27.010 multiplexing protocol is already available for asynchronous communication of e.g. binary data and facsimile data, no additional convergence layer will have to be implemented for speech transfer. Instead, the GSM-encoded speech will be communicated asynchronously between the mobile station and the external terminal, possibly in a multiplexed manner together with binary data and/or facsimile data.

Referring now to FIG. 3, the asynchronous communication protocol referred to above will be described in more detail. As already mentioned, the 3G TS 27.010 multiplexing protocol 400 is capable of communicating binary data (such as radio link protocol data) 413 as well as facsimile data (such as fax protocol data) 415 of a higher data layer 420 through an intermediate GSM radio data convergence layer 410. According to the invention, also GSM-encoded voice 414 may be communicated through the convergence layer 410 of the 27.010 protocol 400 in an asynchronous multiplexed manner together with the binary data 413 and the facsimile data 415.

The frame format of the 27.010 protocol 400 is illustrated in FIG. 3 and starts with a Beginning of Frame field 401 having a length of 1 byte. Next a one-byte Address field 402 is provided. The Address field 402 contains a DLCI ("Data Link Connection Identifier") value, which represents one of 127 different logical channels between the mobile station 200 and the external terminal 300 (FIG. 2). The logical channels of 3G TS 27.010 are prioritized, the highest priority being given to channel 0 and the lowest priority being given to channel 126. GSM-encoded voice 414 is communicated over highly prioritized logical channels, whereas binary data 413 and facsimile data 415 may use less prioritized logical channels.

Following the Address field 402 there is provided a Control field 403 having a length of 1 byte. The Control field contains standard HDLC control values, which are not referred to in any detail herein. The Data Length field 404 indicates the length of a subsequent Data field 405. The Data field carries the actual information to be communicated through the protocol 400. Preferably, shorter Data fields 405 are used for communicating binary data 413 and facsimile data 415, thereby allowing the GSM-encoded voice 414 to be communicated in Data fields 405 of maximum length.

The frame structure of the 27.010 protocol 400 continues with a 1-byte Frame Check Sequence field 406. This field is adapted to store a standard HDLC frame check sequence value, which is calculated either on the fields 401, 402 and 403 or on all fields 401–405 depending on the frame type (as set by the Control field 403). The frame is completed by an End of Frame field 407, which occupies 1 byte.

The convergence layer 410 appends a DTX/Credit byte 411 to the data 412 to be transmitted, which may be radio link protocol data 413, fax protocol data 415 or GSM-encoded voice data 414. Thanks to this, the radio transmission from the mobile station 200 may be controlled, so that the transmitter 212 becomes idle, when the mobile station 200 has no data to send. This functionality is called Discontinuous Transmission (DTX). The information necessary to handle DTX is carried from the external terminal 300 to the mobile station 200 in a DTX bit, which occupies the most significant bit of the DTX/Credit byte 411.

Moreover, the three least significant bits of the DTX/Credit byte 411 are used in the following way. The mobile station 200 may buffer up-link radio data frames, and in order to tell the external terminal 300 how many radio data frames it can accept, the mobile station will provide a credit value to the external terminal 300. The external terminal decreases the credit for every radio data frame sent to the mobile station. When the mobile station is able to transmit radio data frames, it will increase the credit again. The credit value update information is sent together with the data frames 412 from the mobile station 200 to the external terminal 300. The maximum credit value is 7. The credit value can also be used from the mobile station 200 to the external terminal 300 as a form of flow control. The external terminal 300 may send a credit value of 0 to the mobile station 200, indicating that the mobile station 200 may not send any radio data frames to the external terminal 300 and, consequently, that the radio data must be discarded. Thus, in the present invention the above-described DTX/Credit mechanism is used to synchronize the sender (e.g. the mobile station) and the receiver (e.g. the personal computer) in order to avoid buffer overflow and loss of speech frames.

The present invention has been described above with reference to some embodiments. However, other embodiments than the ones referred to above are equally possible within the scope of invention, which is best defined by the appended independent claims.

What is claimed is:

1. A portable communication apparatus for radio communication of digital speech data and digital non-speech data, the apparatus comprising:
    an asynchronous interface for exchanging both digital speech data and digital non-speech data with an external terminal;
    a multiplexer for multiplexing the speech data and the non-speech data on the asynchronous interface;
    means for determining a total available bandwidth on the asynchronous interface; and
    means for prioritizing the speech data over the non-speech data, wherein if the total available bandwidth is not sufficient to transmit both the speech data and the non-speech data, only the speech data is transmitted.

2. The portable communication apparatus as claimed in claim 1, wherein said digital non-speech data relate to binary data and/or facsimile data.

3. The portable communication apparatus as claimed in claim 2, wherein said asynchronous interface includes a multiplexing protocol comprising a GSM radio data convergence layer.

4. The portable communication apparatus as claimed in claim 1, wherein said asynchronous interface comprises serial communication means.

5. The portable communication apparatus as claimed in claim 1, wherein the apparatus is a mobile telephone.

6. The portable communication apparatus as claimed in claim 1, further comprising a speech encoder for encoding and compressing the speech data, thereby reducing the required bandwidth for the speech data and increasing the remaining available bandwidth for non-speech data.

7. An external terminal for use with a portable communication apparatus of the type capable of radio communication of digital speech data and digital non-speech data, the external terminal comprising:
    an asynchronous interface for exchanging both digital speech data and digital non-speech data with the portable communication apparatus;
    a multiplexer for multiplexing the speech data and the non-speech data on the asynchronous interface;
    means for determining a total available bandwidth on the asynchronous interface; and
    means for prioritizing the speech data over the non-speech data, wherein if the total available bandwidth is not sufficient to transmit both the speech data and the non-speech data, only the speech data is transmitted.

8. The external terminal as claimed in claim 7 wherein said digital non-speech data relate to binary data and/or facsimile data.

9. The external terminal as claimed in claim 8, wherein said asynchronous interface comprises serial communication means.

10. The external terminal as claimed in claim 8 wherein said asynchronous interface includes a multiplexing protocol comprising a GSM radio data convergence layer.

11. The external terminal as claimed in claim 7, wherein the terminal is a personal computer.

12. The external terminal as claimed in claim 7, further comprising a speech encoder for encoding and compressing the speech data, thereby reducing the required bandwidth for the speech data and increasing the remaining available bandwidth for non-speech data.

13. A method of communicating both digital speech data and digital non-speech data between a portable communication apparatus and an external terminal connected to the portable communication apparatus, said method comprising:
    establishing an asynchronous interface between the portable communication apparatus and the external terminal for exchanging both digital speech data and digital non-speech data;
    determining whether a total available bandwidth on the asynchronous interface is sufficient to transmit both the speech data and the non-speech data;
    multiplexing the speech data and the non-speech data on the asynchronous interface if the total available bandwidth on the asynchronous interface is sufficient to transmit both the speech data and the non-speech data; and
    transmitting only the speech data if the total available bandwidth on the asynchronous interface is not sufficient to transmit both the speech data and the non-speech data.

14. The method according to claim 13, wherein said digital non-audio data relate to binary data and/or facsimile data.

15. The method according to claim 14, wherein the step of establishing an asynchronous interface includes utilizing a GSM radio data convergence layer.

16. The method according to claim 13, wherein the portable communication apparatus is a mobile telephone.

17. The method according to claim 13, wherein the external terminal is a personal computer.

18. The method according to claim 13, further comprising compressing the speech data, thereby reducing the required bandwidth for the speech data and increasing the remaining available bandwidth for non-speech data.

* * * * *